Figure 1:
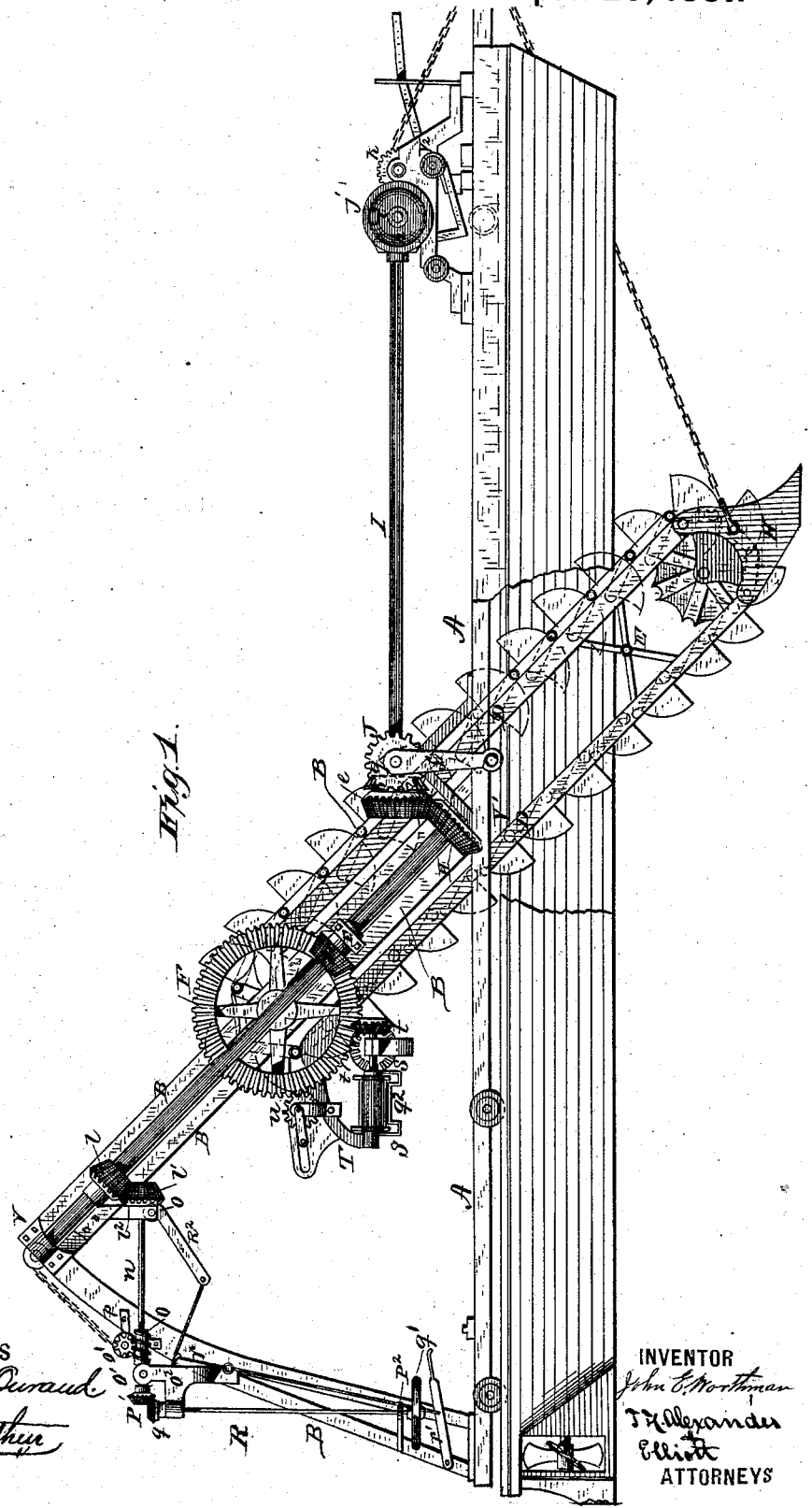

J. E. WORTHMAN.
Dredging-Machine.

No. 240,566.

15 Sheets—Sheet 4.

Patented April 26, 1881.

WITNESSES

INVENTOR

ATTORNEYS

J. E. WORTHMAN.
Dredging-Machine.
No. 240,566.
15 Sheets—Sheet 5.
Patented April 26, 1881.
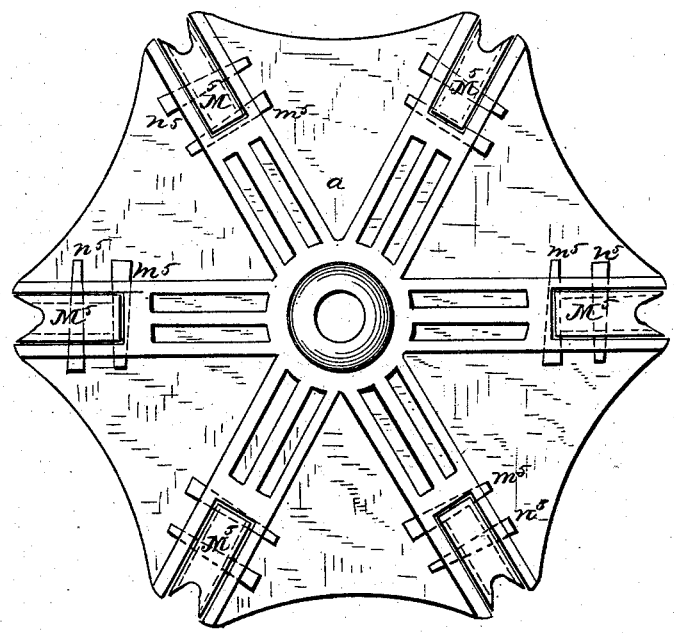
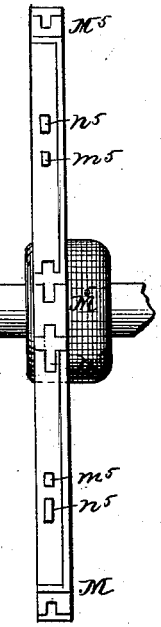
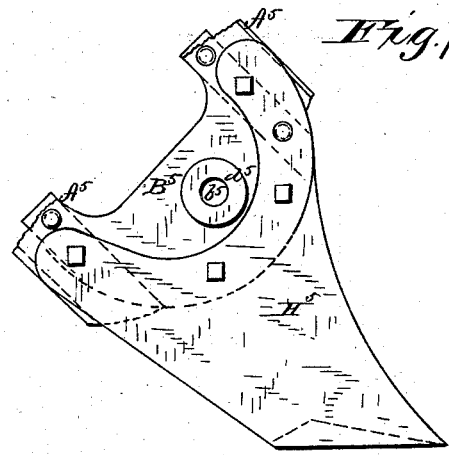
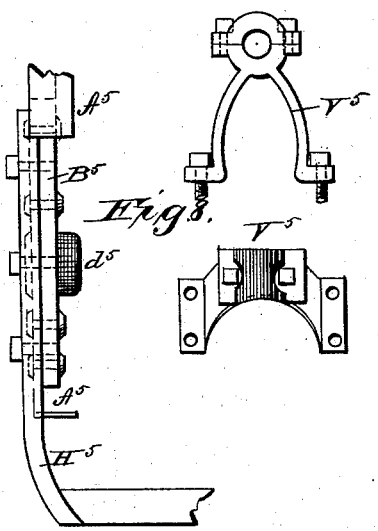
WITNESSES
INVENTOR
ATTORNEY J. E. WORTHMAN.
Dredging-Machine.
No. 240,566.  Patented April 26, 1881.
15 Sheets—Sheet 6.
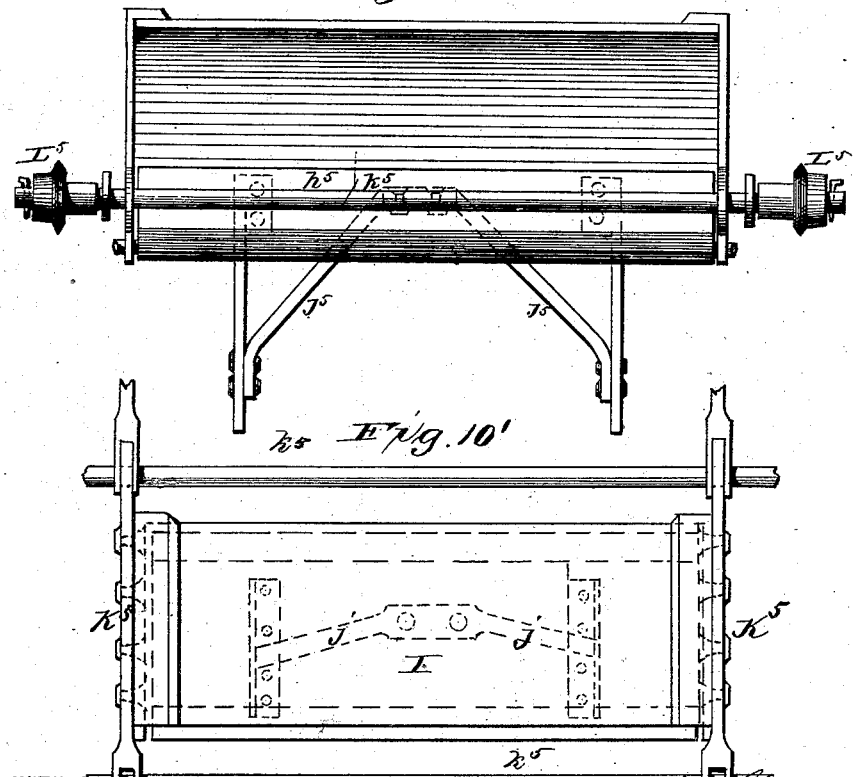

J. E. WORTHMAN.
Dredging-Machine.
No. 240,566. Patented April 26, 1881.
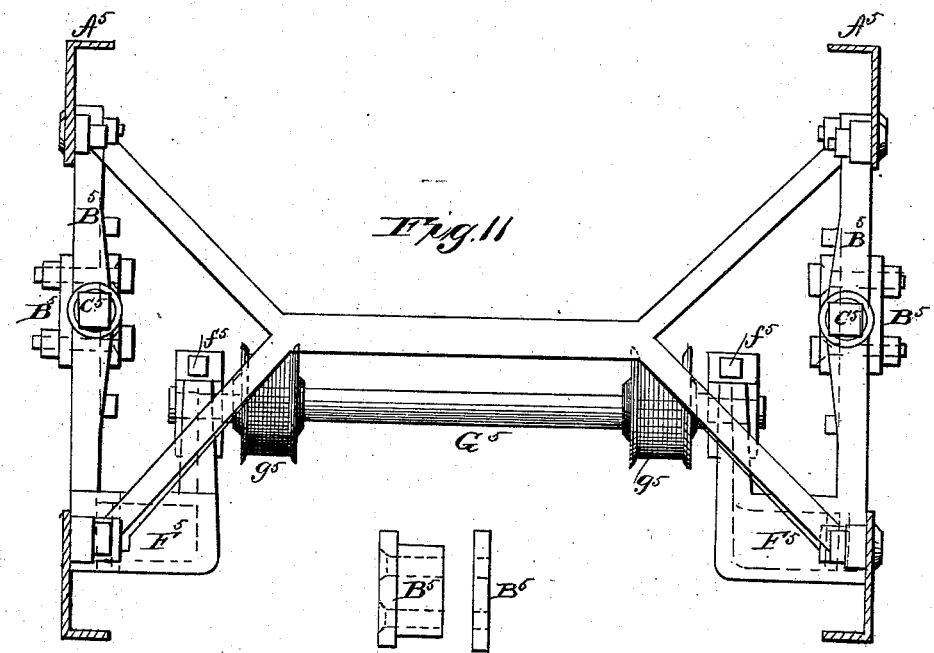
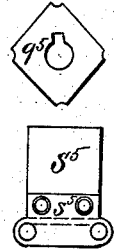
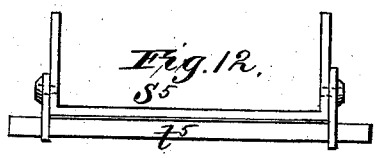
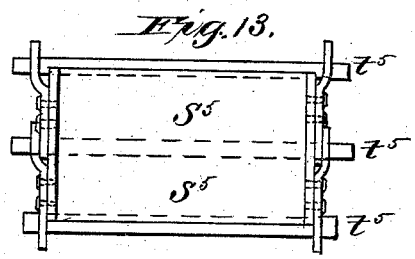

J. E. WORTHMAN.
Dredging-Machine.
No. 240,566. Patented April 26, 1881.
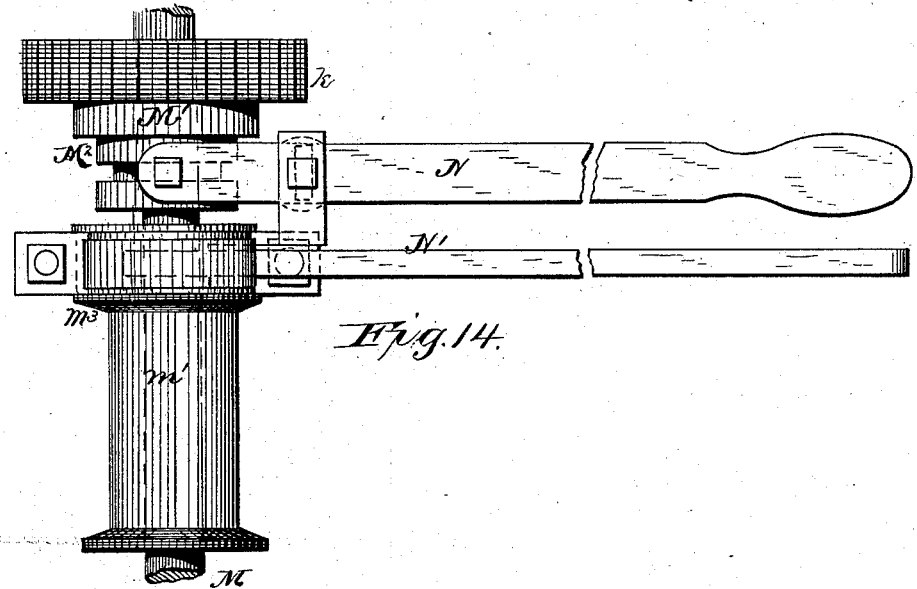
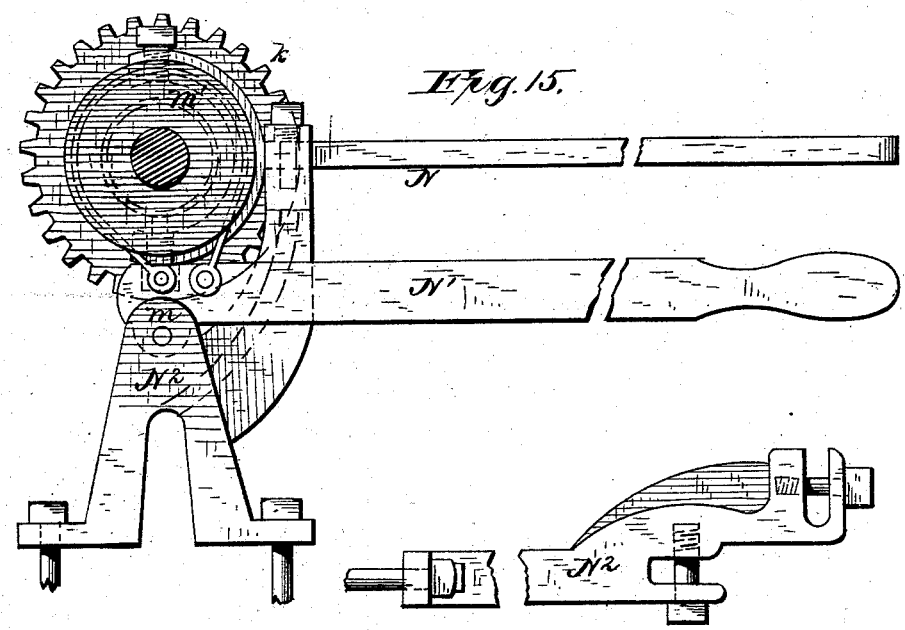
WITNESSES
INVENTOR
ATTORNEY J. E. WORTHMAN.
Dredging-Machine.
No. 240,566.     Patented April 26, 1881.
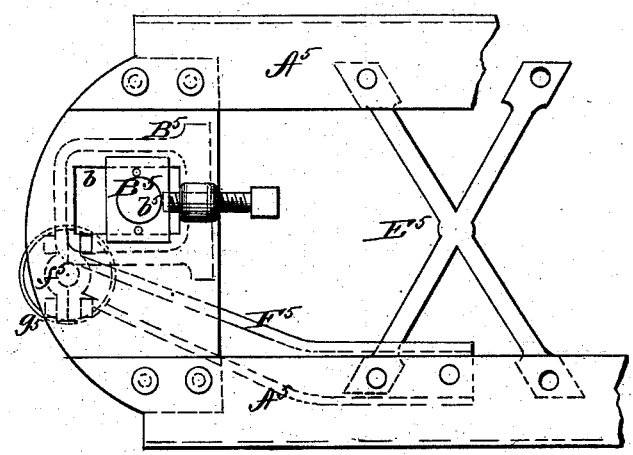
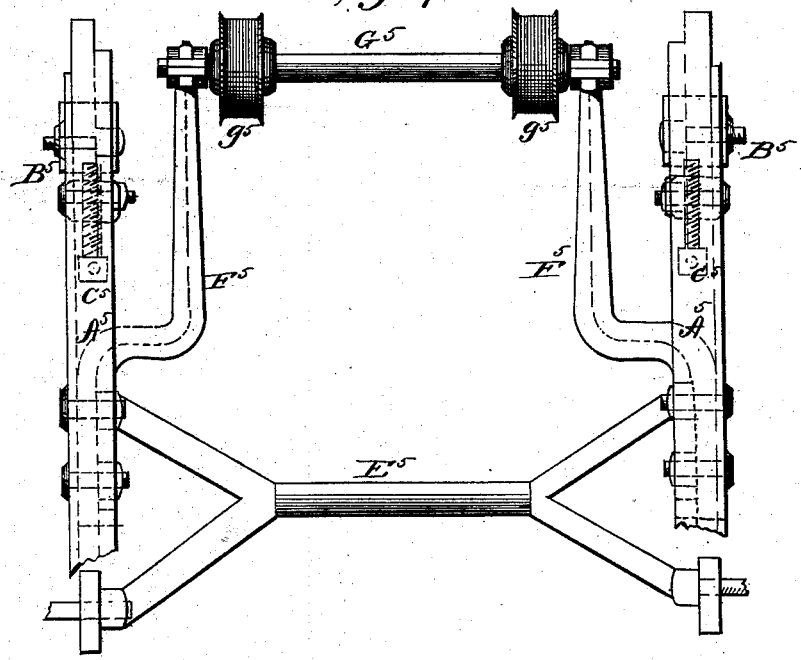

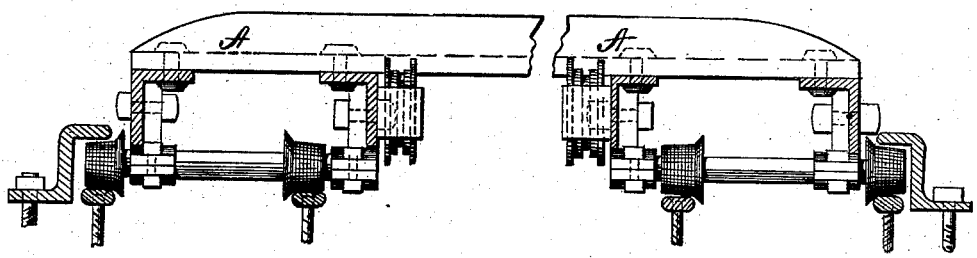
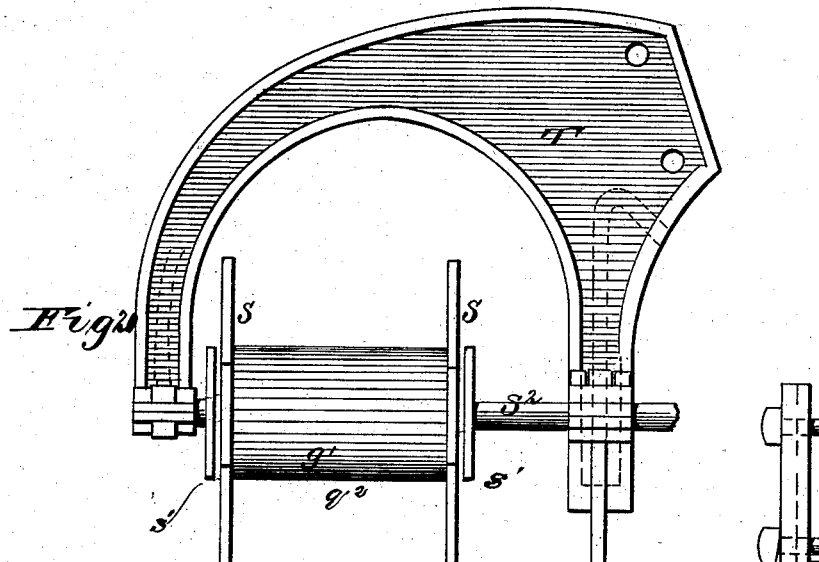
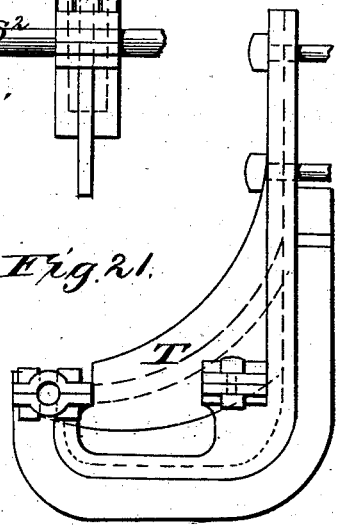

J. E. WORTHMAN.
Dredging-Machine.
No. 240,566.  Patented April 26, 1881.
15 Sheets—Sheet 11.
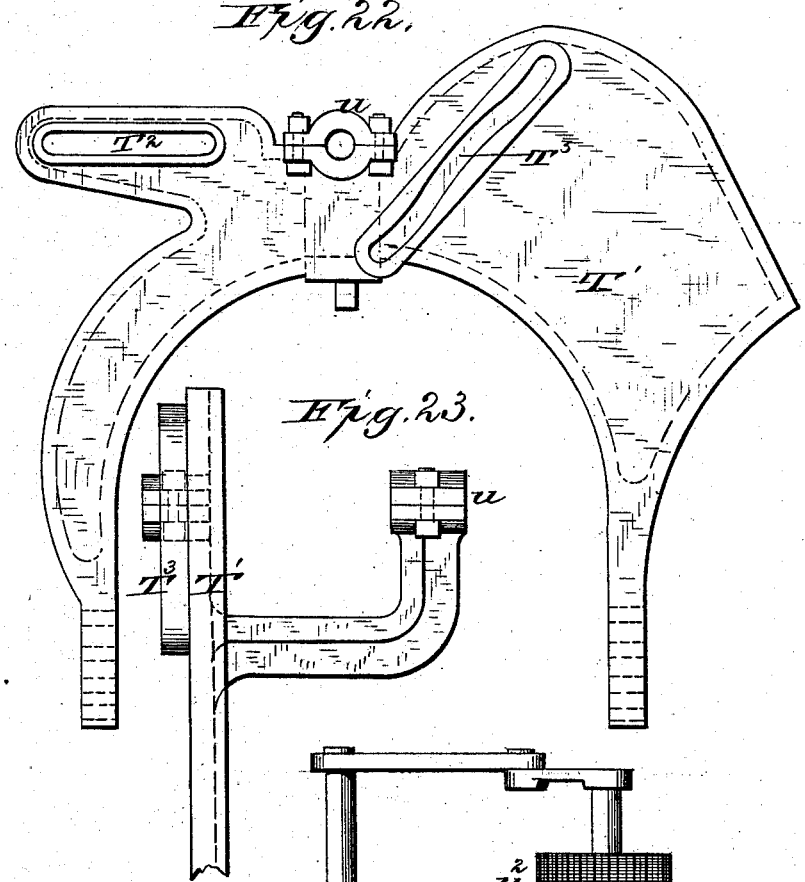
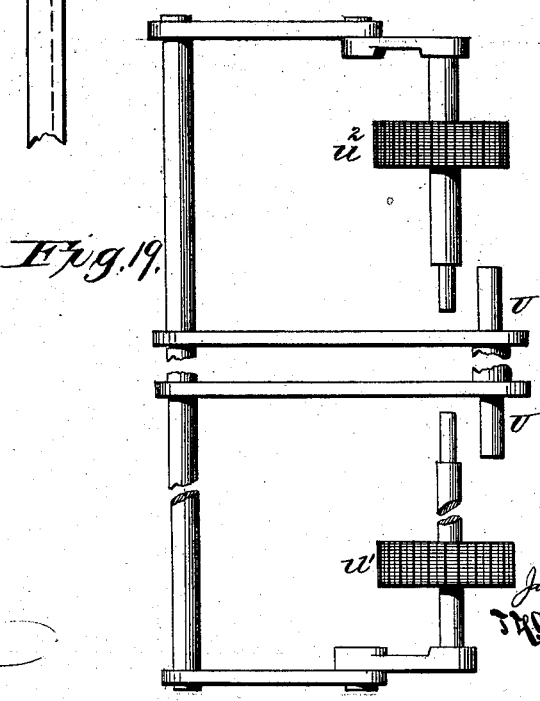
WITNESSES
Franck L. Ourand
N. C. McArthur
INVENTOR
John E. Worthman
T. H. Alexander & Elliott
ATTORNEY J. E. WORTHMAN.
Dredging-Machine.
No. 240,566. Patented April 26, 1881.
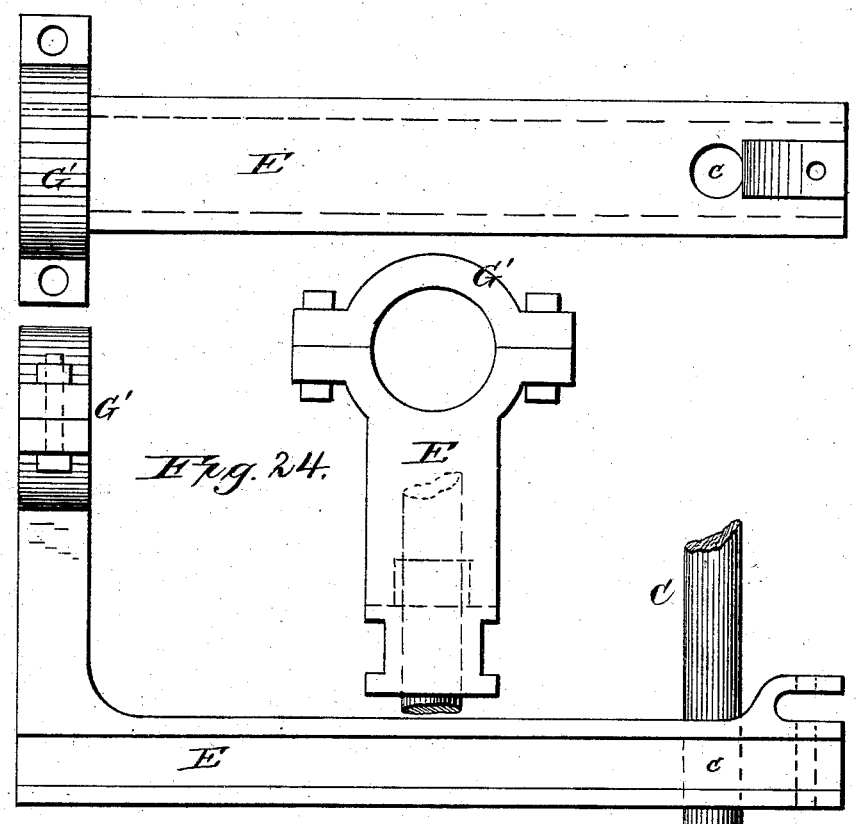
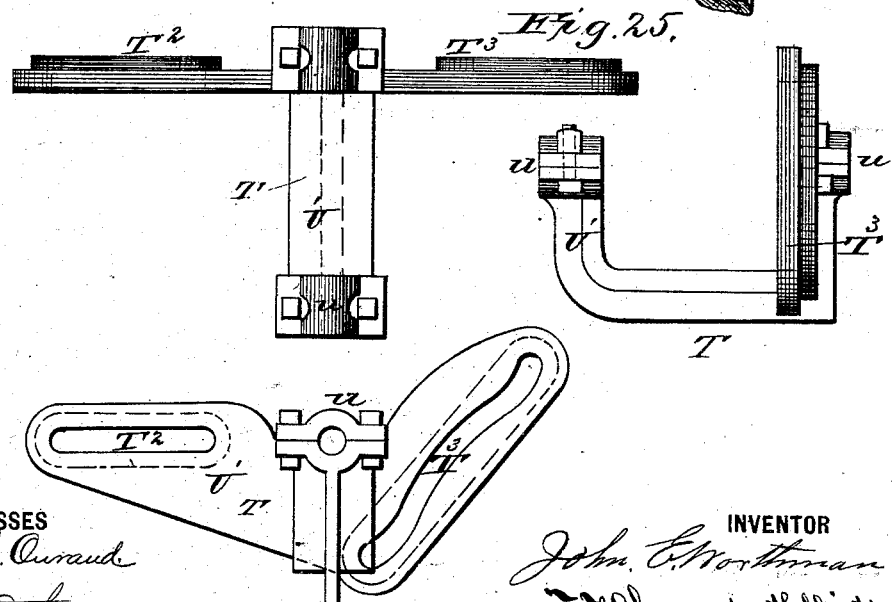

J. E. WORTHMAN.
Dredging-Machine.
No. 240,566. Patented April 26, 1881.
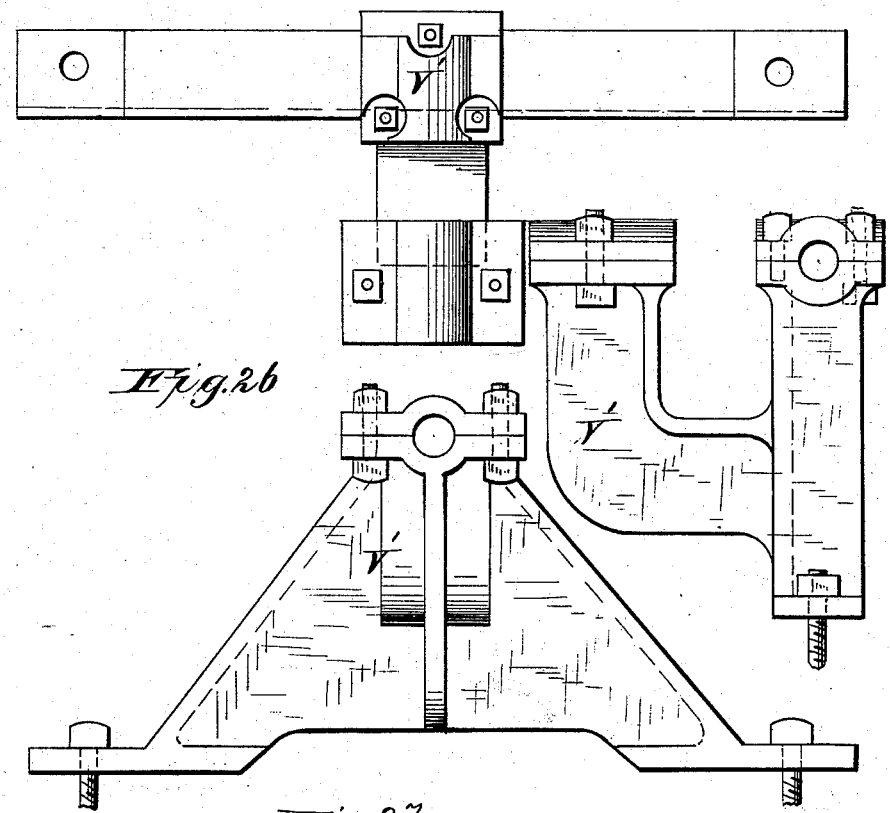
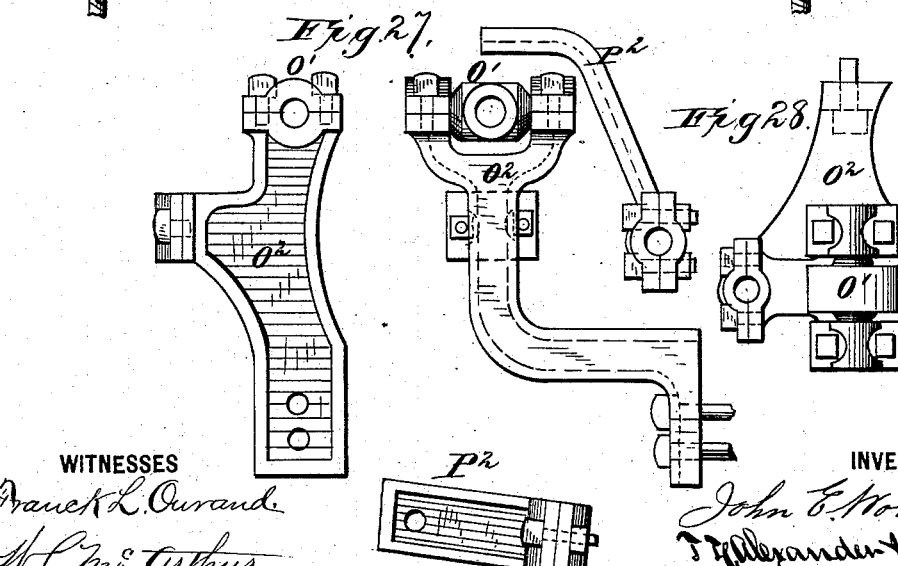

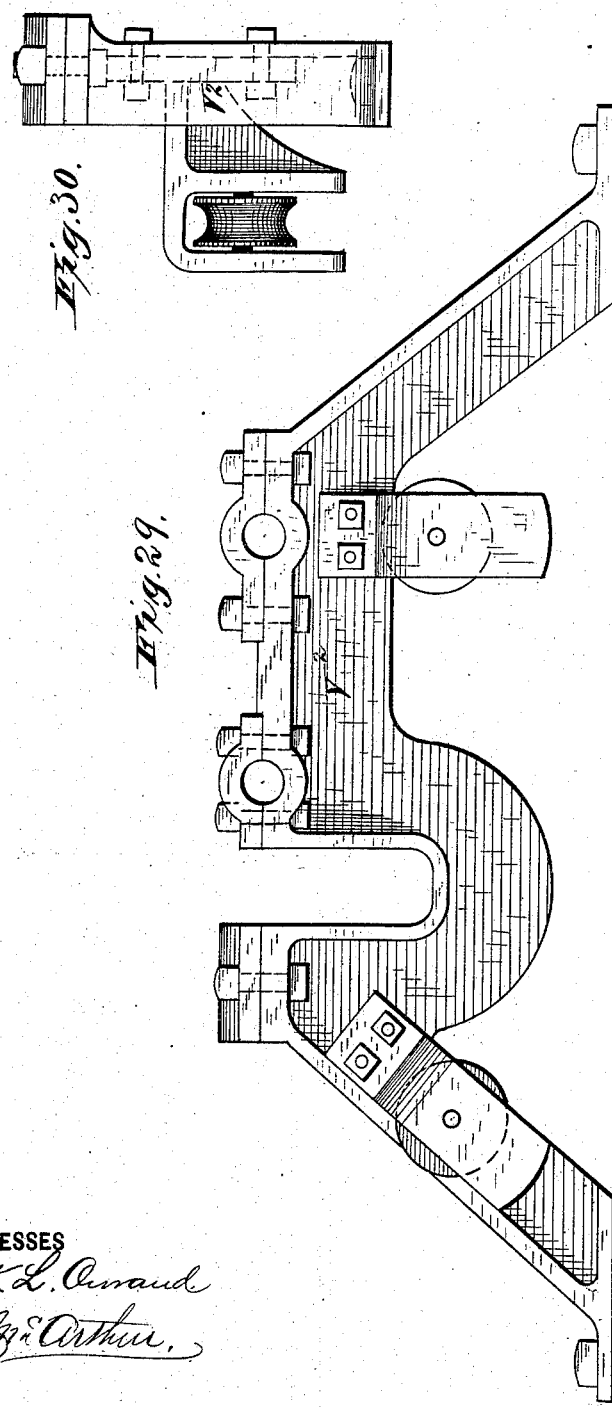

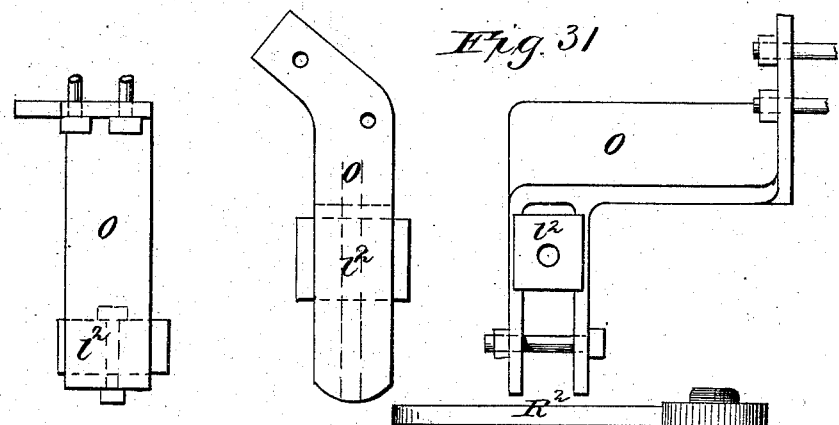
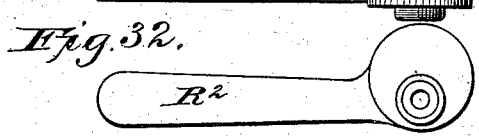
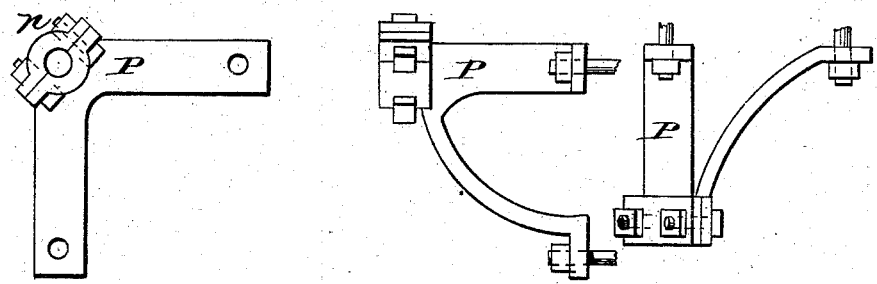
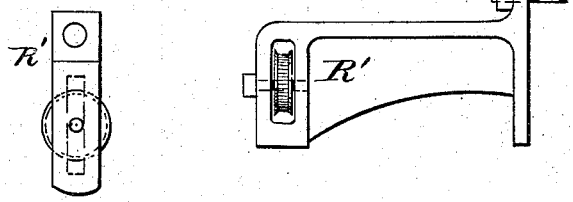

UNITED STATES PATENT OFFICE.

JOHN E. WORTHMAN, OF MOBILE, ALABAMA.

DREDGING-MACHINE.

SPECIFICATION forming part of Letters Patent No. 240,566, dated April 26, 1881.

Application filed November 7, 1879.

*To all whom it may concern:*

Be it known that I, JOHN E. WORTHMAN, of Mobile, in the county of Mobile and State of Alabama, have invented certain new and useful Improvements in Dredging-Machines; and I do hereby declare that the following is a full, clear, and exact description thereof, reference being had to the accompanying drawings, and to the letters of reference marked thereon, which form part of this specification.

The object of my invention is, in part, to automatically discharge the excavated material from the buckets onto an endless apron or carrier, which will deposit the same at any desired distance from the dredge. This I accomplish by forming the buckets with hinged or pivoted bottoms of such form and arrangement that when the loaded bucket arrives at the proper discharging-point the bottom is forced up by two cams on its under side coming in contact with rollers or wheels and causing the material to be forced out of the bucket by the bottom being raised even with the mouth of the bucket, which passes close enough to a scraper-bar so as to effectually remove all the material from the bucket and cause it to fall on an endless apron or carrier, which also passes close to a cleaning-bar at its discharging-point.

It also has in view a reciprocating motion of the truck and gallows-frame carrying the working parts, so as to make a cut of some length while the hull is at rest and held in position by spud-posts or otherwise. This I accomplish with two capstans, $j\ j$, two cables, and a friction-clutch, $M^4$. The cables or hawsers are to be attached to piles or anchors, thence lead to and under the forward sheaves of the capstans, then up around the capstans and under the after-sheaves aft to piles or anchors, where they are made fast. If preferred, the hawsers or cables may be made fast at the bow and stern to the boat itself. I do not, however, confine myself strictly to this method of operating the truck, as many other good methods may be employed. For instance, I may use gearing or endless chains to accomplish the same purpose. By throwing the clutch $M^4$ in gear the capstans $j$ will haul the truck, with the gallows-frame, by the two cables forward, and as the truck arrives at a given point the clutch will be thrown automatically (or by hand) out of gear, the buckets continuing to revolve and fill. When the clutch is thrown out of gear the capstans no longer haul the truck, with the gallows-frame, forward, and as the buckets are not stopped by the clutch being out of gear, but still continue to revolve and dig or cut into the bottom, and as the bucket-ladder is lowered at the end or change of each stroke or motion sufficiently to allow the buckets to deepen the cut, then the combined weight of the truck, gallows-frame, and machinery causes the buckets to fill, and at the same time draw the truck, with the gallows-frame, by the action of the buckets on the bottom back to the starting-point, where the clutch is thrown in gear again, thus making a continuous reciprocating motion.

It will thus be seen that by lowering my bucket-ladder at the end of each forward movement or cut the buckets will be thrown in contact with the earth again, and their resistance will draw the bucket-ladder back to the starting-point, while at the same time the buckets will fill with earth, and as they revolve will deepen the cut at the backward as well as the forward motion, accomplishing double the usual amount of work, besides automatically drawing the frame backward.

It further consists in holding the truck and gallows-frame immovable and giving a swinging or oscillating motion to the bucket-ladder, so as to make a cut of some length without moving the hull, truck, or gallows-frame. This is accomplished by throwing the clutch $M^4$ out of gear and another clutch, $M^2$, in gear, which causes the bucket-ladder to be hauled forward by the oscillating chains attached to two windlasses, $m'\ m^2$, to a given point, when said clutch $M^2$ is thrown out of gear. The buckets, continuing to revolve and fill, will draw the bucket-ladder back to the starting-point by the resistance of the buckets on the bottom, where the clutch is again thrown in gear, thus giving a continuous swinging or oscillating motion to the bucket-ladder.

The invention also has in view holding the truck and frame in a fixed position and propelling the hull by steam-power applied through the propelling-wheels, hawsers, or cables, so as to make a continuous cut of any required length; also, protecting the buckets with a plow from snags or other similar obstructions; also, raising and lowering the bucket-ladder with friction or cog gearing; also, to take up the slack or wear of the bucket-links K with the adjustable boxes M of the spiders $a$.

The invention further has in view being used as a ditching, plowing, and excavating machine, which may be accomplished by placing the truck with a gallows-frame on a track or tramway and propelling the same by steam or other power applied through the hawsers or cables, so as to make a continuous cut of any desired length.

The track or tramway may also be dispensed with and the machine used with suitable wheels in ditching or plowing fields, swamps, or other similar places.

The dredge consists of a hull or twin hulls firmly secured together, on which tracks are laid to carry a truck, said truck having a gallows-frame which supports the bucket-ladder and the necessary machinery for operating the endless chain of buckets, also the endless apron or carrier.

Figure 2:
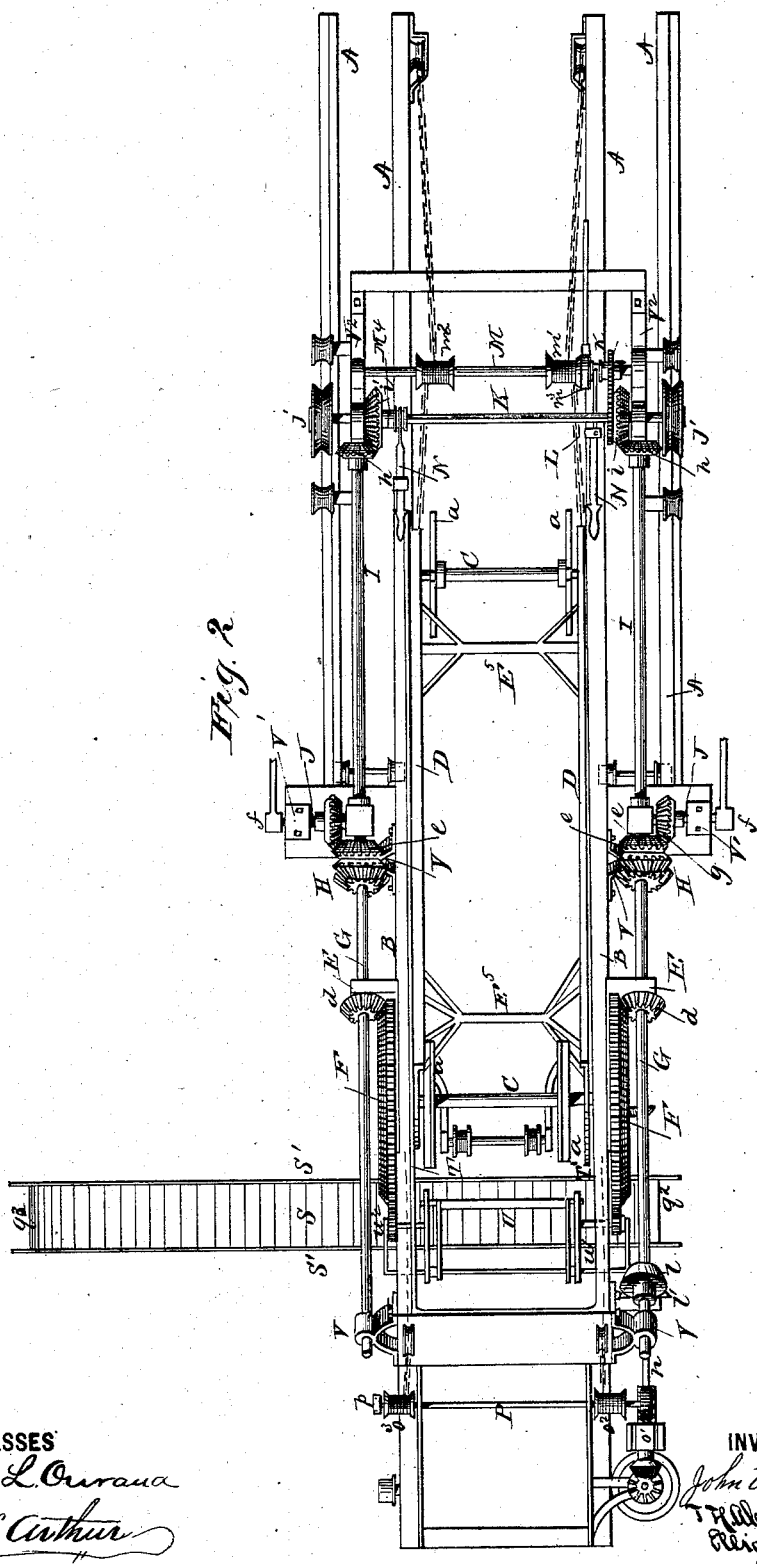

In the annexed drawings, Figure 1 is a side elevation of my machine, partly in section. Fig. 2 is a top or plan view, and Fig. 3 a front elevation, of the same. Fig. 4 is an enlarged section of the top of the bucket-ladder and chain of buckets. Figs. 5 and 6 show the spider with adjustable boxes, with the means for adjusting the same. Figs. 7 and 8 show the lower end of bucket-ladder and plow. Figs. 9, 10, and 10' show the bucket. Fig. 11 is a section of the upper end of the bucket-ladder, showing the rollers which operate the cams on the bottom of the buckets. Fig. 12 is a front elevation of a section of the endless apron. Fig. 13 is a top view, showing two sections of the apron linked together. Figs. 14 and 15 show details of the windlass. Fig. 16 is a side view of upper end of bucket-ladder. Fig. 17 is a top view of the same, showing the manner of bracing and the cast-iron plates $B^5$. Fig. 18 is a detailed view of the movable truck. Fig. 19 is a plan of the bucket-scraper. Figs. 20 to 34 are detailed views of brackets, supports, and other parts used in constructing the machine, and referred to by letters in the description.

A represents a truck, made of wrought angle-iron or other suitable material, to which the gallows-frame B is bolted or otherwise fastened. This gallows-frame is also made of wrought angle-iron or other suitable material.

C C, Fig. 2, are shafts, to which spiders or wheels $a\ a$, Figs. 5 and 6, are keyed, over which the chain of buckets passes. The upper shaft C rests in bearings at $b\ b$ in slots in the upper end of the bucket-ladder D, and the lower shaft in bearings $d^5$ in the lower end of the bucket-ladder frame. The ends of the upper shaft C also project laterally and rest in bearings at $c\ c$ of brackets E E, Figs. 2, 3, and 24. These brackets E E are provided with grooves fitted within the gallows-frame, on which frame they slide. The upper shaft C receives its motion through the bevel-wheels F F, Figs. 1, 2, 3, which have two faces, and are combined bevel and spur wheels and bevel-pinions $d\ d$, Figs. 1, 2, 3, said pinions being fitted with feathers on the inclined shafts G G. The under sides of these pinions are also provided with journals and fitted within journal-boxes on the brackets E E, Fig. 24, so as to be raised and lowered with said brackets and held continuously in gear with the bevel-wheels F F.

The shafts G G receive motion through the pinions H H, Figs. 1 and 2, keyed to the lower ends of said shafts, and which pinions gear with double bevel-pinions $e\ e$, Fig. 2, keyed to the shafts I I. The shafts receive motion through bevel-pinions $g\ g$ and cranks $f$, Fig. 2, keyed to crank-shafts J J.

$h\ h$ are bevel-pinions keyed to the forward ends of the shafts I I, Figs. 1 and 2, which said pinions gear with bevel-pinions $i\ i'$, running loosely upon the capstan-shaft K, Figs. 1 and 2. The bevel-pinion $i'$ is cupped so as to form the female part of the friction-clutch $M^4$, Fig. 2. The male part of this clutch is fitted with a feather on the capstan-shaft K, Fig. 2, which shaft thus receives its motion, when the clutch is thrown in gear, through the bevel-pinion $i'$.

Figure 3:
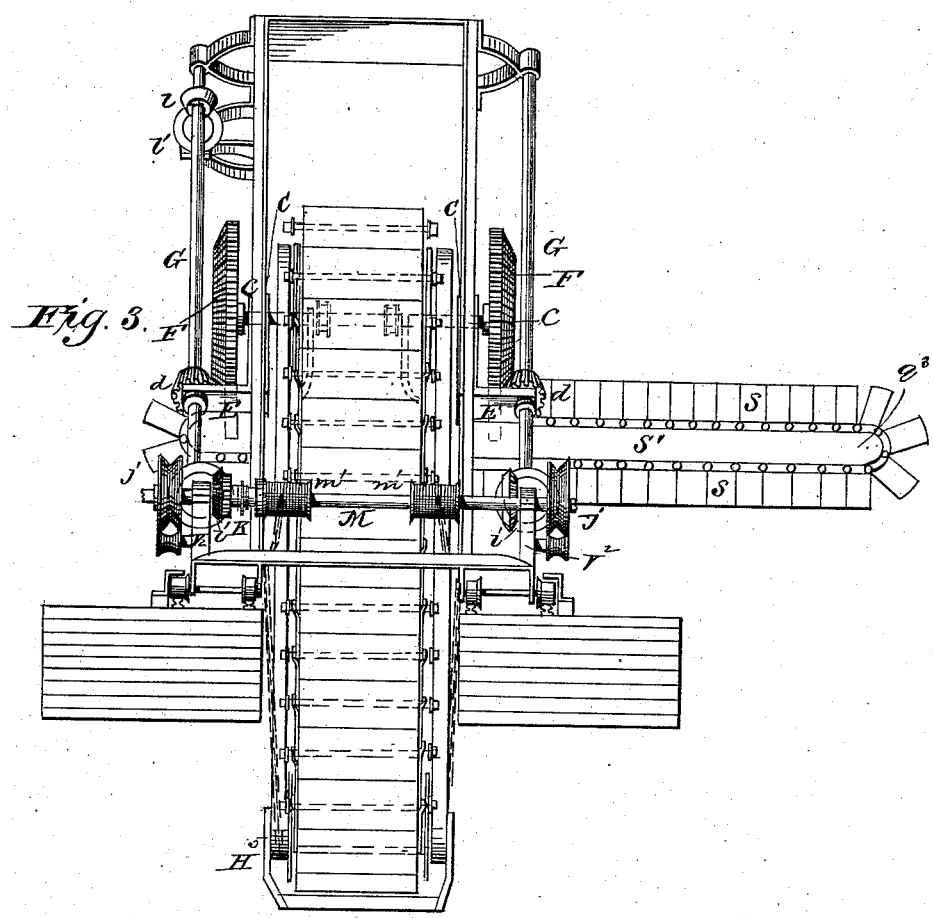
Figure 4:
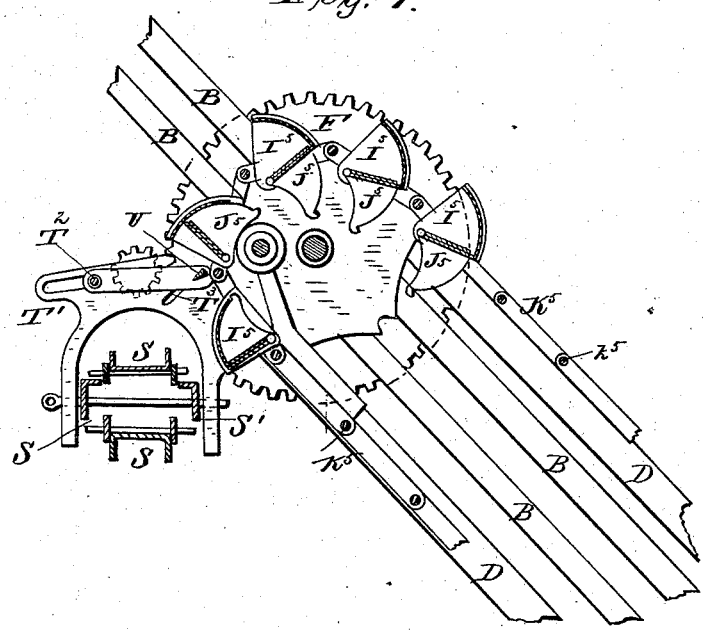

$j\ j$ are capstans keyed to the capstan-shaft K, Figs. 1, 2, and 3, which capstans should be provided with alternate ribbed V-shaped grooves to receive the cables or hawsers for moving the truck and gallows-frame forward, as above described.

The bevel-pinion $i$, which is loose upon shaft K, has a spur-face, L, Figs. 1, 2, and 3, which gears with the spur-wheel $k$ running loosely on the windlass-shaft M, Figs. 2 and 3. The spur-wheel $k$ is also cupped so as to form the female part of the friction-clutch $M'$. $M^2$ is the sliding male part of this friction-clutch, connected by a feather with the windlass-shaft M, Figs. 2 and 14.

From the above it will be seen that the operations of the capstans $j\ j$ are actuated and controlled by the bevel-wheel $i$ and its clutch, and those of the windlasses $m'\ m^2$ by the bevel-wheel $i$ and the clutch $M'$.

N, Figs. 2, 14, and 15, is a forked lever, which I prefer to provide with a set-screw in each prong, to engage in the groove of the male part of the clutch, by which the clutch is thrown in and out of gear. The windlass-shaft M receives its motion, when the clutch is thrown in gear, through the spur-wheel $k$.

N' is a lever, to which both ends of a friction-band passing over friction-pulley $m^3$ are attached. This band is for the purpose of holding the bucket-ladder at any desired angle, and also to regulate the pressure with which the buckets encounter the resistance of the soil. In case a bucket meets an obstruction the brake will permit the bucket-ladder to yield and prevent breakage. I may apply brakes of any well known kind to the truck-wheels.

$m'$, Figs. 2, 3, and 14, is a windlass keyed to the shaft M. This windlass is provided with the friction-pulley $m^3$, Figs. 2 and 14, on which the friction-band works. $m^2$, Figs. 2 and 3, is also a windlass keyed to the same shaft M, and to these two windlasses $m'$ $m^2$ are attached the oscillating chains of the bucket-ladder, by which the ladder obtains its oscillating or swinging motion.

To the upper end of the inclined shaft G is keyed a friction-wheel, $l$, Figs. 1, 2, and 3, which engages, when thrown in gear, with a friction-wheel, $l'$, Figs. 1, 2, 3, keyed on the shaft $n$, Figs. 1 and 2. The forward end of this shaft rests in sliding boxes $l^2$, Figs. 1 and 31, of the hangers O. The rear end of the shaft $n$ rests in an oscillating box, O', Figs. 1 and 27, which itself is pivoted in a bracket-hanger, $O^2$. This shaft $n$ is provided with an endless worm, $o$, which registers with a worm-wheel, $o'$, keyed to the windlass-shaft P, Figs. 1 and 2. The shaft P is provided with two windlasses, $o^2$ $o^3$, to which the hoisting-chains of the bucket-ladder are attached, and the shaft rests in bearings $p$ $p$, Fig. 33.

P' is a bevel-pinion keyed to the shaft $n$, Figs. 1 and 2, and gears with a bevel-pinion, $q$, keyed to the vertical shaft R, Figs. 1 and 2. The lower end of this shaft R is provided with a hand-wheel, $q'$, Figs. 1 and 2, and rests in bracket-bearing $P^2$, Figs. 1, 2, 27, the upper end resting in bracket-bearing $O^2$.

R', Fig. 34, is a bracket provided with a chain-sheave, over which a chain, $r$, Fig. 1, passes, one end of said chain being attached to a cam-lever, $R^2$, Figs. 1 and 32, while the other end is attached to a rod which is connected to a lever, $r'$, Fig. 1. The lever $R^2$ is pivoted in the hanger O, Fig. 1. By this construction and arrangement of parts, as soon as the lever $r'$ is depressed and the friction-wheel $l'$ thrown in gear the shaft $n$ revolves, causing the hoisting-chains to be wound upon the windlasses $o^2$ $o^3$, thereby raising the bucket-ladder to any desired height. The bucket-ladder may be lowered to any desired point by turning the hand-wheel $q'$, Figs. 1 and 2.

S, Figs. 1, 2, 3, and 20, is an endless apron or carrier traveling on the frame S', Figs. 2, 3, and 20. This frame may be made of wrought angle-iron or other suitable material.

$S^2$ is a shaft, to which is keyed a barrel, $q^2$, Figs. 1, 2, 3, and 20. There is also a similar barrel, $q^3$, pivoted at the opposite end of the frame S'. Over both of said barrels the endless apron passes. The shaft $S^2$ receives its motion through the bevel-pinion $t$, Fig. 1, which is keyed to the forward end of said shaft. This pinion $t$ gears with the bevel and spur pinion $t'$, the spur-face of which gears with the spur-surface of the wheel F.

T is a bracket-hanger bolted to the upper outside end of the bucket-ladder, which supports the shaft $S^2$, Figs. 1, 20, and 21. T', Figs. 4, 22, and 25, is also a bracket-hanger bolted to the bucket-ladder opposite the bracket T, which supports the frame S' of the endless apron. The bracket-hangers T T' are provided with journal-boxes $u$, Figs. 22, 23, 25, and are here shown detached from the hangers T T' and adapted to be bolted thereto; but they may be made in one piece with the hangers, if desired. These hangers are also provided with guides or slides $T^2$ $T^3$, the latter of which receives the ends of the scraper-bar U, Figs. 4 and 19.

$u'$ $u^2$ are spur-wheels, the shafts of which rest in the boxes $u$, and which gear with the spur-wheels F F, so as to impart motion to the scraper-bar. By this arrangement of parts the scraper-bar will pass close enough to the mouth of each bucket and raised bottom to effectually remove or scrape the excavated material onto the endless apron, to be deposited at any desired point.

V V are brackets, in which the inclined shafts G G rest.

V' V' are standards, in which the rear ends of shafts I I and crank-shafts J J rest, Figs. 1, 2, and 26.

$V^2$ $V^2$, Figs. 1, 2, 3, 24, and 30, are standards, in which the forward ends of the shafts I I, capstan-shaft K, and windlass-shaft M rest.

The bucket-ladder D is made of wrought angle-irons $A^5$, so constructed as to form a track on the outside of the ladder for the loaded buckets going up, and also a track on the inner under side of the ladder for the empty or discharged buckets coming down. These angle-irons $A^5$, Figs. 7, 16, and 17, are riveted at each end of the ladder to cast-iron plates $B^5$. The upper cast-iron plates are provided with slots, in which the journal-boxes of the bearings $b$ $b$ of the upper spider-shaft C slide, said boxes being made in two parts bolted together, and adjustable by set-screws. The lower cast-iron plates $B^5$ of the bucket-ladder are each provided with a boss, $d^5$, in which the lower spider-shaft C is journaled. The frames which form the bucket-ladder are bolted together by two four-pronged braces, $E^5$ $E^5$, Figs. 2, 11, 16, and 17.

$F^5$ $F^5$, Figs. 2, 3, 4, 16, and 17, are brackets bolted to the upper inner sides of the bucket-ladder. These brackets are provided with journal-boxes $f^5$ $f^5$, Figs. 11, 16, and 17, in which rests the shaft $G^5$, Figs. 2, 3, 4, and 17. To said shaft are keyed cam-rollers $g^5$ $g^5$, over which the cams $J^5$ $J^5$ of the buckets $I^5$ pass, Figs. 4, 9, 10, and 10'. By this arrangement of parts, as soon as the loaded buckets arrive at the discharging-point the cams $J^5$ will come in contact with the rollers $g^5$, over which they pass, forcing the bottoms $h^5$ up even with the mouth of the buckets, causing the material to be discharged onto the endless apron.

The lower end of the bucket-ladder is provided with a plow, $H^5$, Figs. 1, 3, and 7, which is bolted to the same by bolts on each side, and may be dispensed with if the bottom is free from snags or other similar obstructions.

$l^5$, Figs. 9, 10, 10', is the bucket, having its bottom $h^5$ pivoted at $i^5$, and said bottom provided with cams $J^5$ and angular braces, as shown. The ends of the bucket are flanged and the back riveted thereto. The bucket is riveted to the links $K^5$, and the pivots of the bottom $h^5$ are below the links, as shown in Fig. 9, whereby the bucket is thrown at such an angle as to cut instead of scrape the earth. There are other reasons for placing the pivot below or within the center line of the links. By attaching the links above the pivot of the bottom, (which is the center from which the periphery of the bucket must be described,) the strain upon the fastenings of the links is reduced, because of the less projection of the cutting-edge outside of the links. The strain upon the end of the bucket is less from the same cause. The buckets may be of sufficient capacity and described with a larger radius, using a smaller portion of a circle, requiring less motion of the bottom, and consequently less length of projection of the cams.

The links $K^5$, Figs. 1, 3, 4, 10', form the chain, and the buckets are linked together by rods $k^5$, which are at their ends provided with flanged rollers or wheels $L^5$. The outer or larger part of said rollers travels on the frame or track of the bucket-ladder, thereby supporting the buckets. The inner or smaller part of said rollers $L^5$ registers with the adjustable boxes $M^5$ of the spiders $a$. By this arrangement of parts, as soon as the buckets arrive at the spiders the small part of the rollers $L^5$ will register with the boxes $M^5$, causing the endless chain of buckets to be firmly held, and they cannot slip.

The spiders $a$, Figs. 5 and 6, are provided with adjustable boxes $M^5$, which are fitted with two keys, $m^5 n^5$, each. The key $m^5$ is to adjust the box outward and the key $n^5$ to retain it in position. The boxes $M^5$ are also for the purpose of taking up the slack, if any, caused by the wear of the links $K^5$ in the endless chain of buckets.

In plowing the buckets form the furrows of the field, dispensing with the plow altogether in this particular case. The machine will work in a field more on the principle of a spade than a plow, as it takes the soil up bodily and deposits the same turned over.

Having thus fully described my invention, what I claim as new, and desire to secure by Letters Patent, is—

1. A bucket or scoop having a hinged or swinging bottom, said bottom being provided on its under side with cams or other suitable devices for impinging against proper stops, thus forcing the contents from the mouth of the bucket by the movement of said bottom at a given point in its revolution, substantially as described.

2. In combination with an endless revolving carrier constructed with a succession of links, one or more buckets or scoops, having swinging bottoms pivoted at the center of curvature of the buckets, said buckets being attached to the links, with said centers below the links of the chain, whereby destructive leverage is reduced and an increased capacity of the bucket, together with presentation of the cutting-edge at a proper angle to the soil, is obtained, substantially as herein set forth.

3. The combination, with a frame having spider-wheels, of an endless bucket-chain composed of links jointed together by means of rods, said rods extending beyond the links, and their ends provided with flanged rollers of greater circumference at their outer than their inner ends.

4. The combination, in a dredging, excavating, and ditching machine, of the sliding boxes for the chain-bucket shafts and the adjusting set-screws for the same with a slotted or grooved frame provided with spider-wheels having radially-adjustable boxes, substantially as herein set forth.

5. The inclined shafts G, having pinions $d$ feathered thereon, and provided with pinions H at their lower end, in combination with spur-wheels F, the truck, and bucket-chain, substantially as herein set forth.

6. The feathered pinions $d$, provided with journals, in combination with sliding journal-boxes and a bucket ladder-frame, substantially as and for the purpose set forth.

7. The combination of the adjustable pinions $d$ and their sliding brackets or journal-boxes with the combined bevel and spur wheels F and inclined shafts G, substantially as and for the purposes set forth.

8. The combination, in a dredging, excavating, and ditching machine, of a revolving bucket or scoop chain and a slotted or grooved frame with combined bevel and spur pinions F, sliding boxes, and inclined shafts G, all constructed and arranged to operate substantially as described.

9. The spider $a$, provided with adjustable or extensible boxes M, substantially as and for the purpose set forth.

10. In combination with the spider $a$, having adjustable or extensible boxes M, an endless revolving scoop or bucket chain, substantially as and for the purpose set forth.

11. The combination of an endless revolving chain of scoops or buckets having pivoted bottoms and a reciprocating scraper-bar, substantially as and for the purposes herein set forth.

12. The bracket-hangers T T', provided with horizontal and oblique guides, in combination with a scraper-bar and its actuating mechanism, substantially as and for the purposes herein set forth.

13. The worm-shaft $n$, resting near one end in a sliding box and the opposite end in an oscillating or pivoted box, in combination with inclined shafts G and wheels $l\ l^1$, all arranged to operate substantially as and for the purpose described.

14. The combination of the vertical shaft R, worm-shaft $n$, having oscillating and sliding boxes $O'$ $l^2$, and the windlass-shaft P, substantially as and for the purpose set forth.

15. The combination of a revolving bucket-chain and sliding frame or bucket-ladder with windlass-shaft P, worm-shaft $n$, inclined shaft G, and cam-lever $R^2$, all arranged to operate substantially as and for the purposes set forth.

16. The combination of vertical shaft R, worm-shaft $n$, windlass-shaft P, and its chains or cords, with a sliding frame and a revolving bucket-chain, all arranged to operate substantially as and for the purposes set forth.

17. The combination of the capstan-shaft K, with loose pinions $i$ $i'$, shafts I I, with pinions $h$ $h$ and $e$ $e$, the inclined shafts G G, with pinions H H and $d$ $d$, and the upper shaft C, with combined bevel and spur wheels F F, substantially as and for the purposes herein set forth.

18. The combination of the brackets T T', journal-boxes $u$, guides or slides $T^2$ $T^3$, spur-wheels $u'$ $u^2$, scraper-bar U, and the wheels F F, substantially as and for the purposes herein set forth.

19. The combination of the shaft $G^5$, cam-rollers $g^5$, and the bucket $I^5$, having the hinged or pivoted bottom $h^5$, provided with cams $J^5$, substantially as and for the purposes herein set forth.

20. The combination of the bucket-ladder D, the endless revolving bucket or scoop chain provided with rods $K^5$, carrying upon their ends wheels or rollers $L^5$, which are larger at one end than at the other, and the spider $a$, having adjustable boxes $M^5$, all constructed and arranged substantially as and for the purposes herein set forth.

21. The combination of the spider $a$, adjustable boxes $M^5$, and the keys $m^5$ $n^5$ for each box, substantially as and for the purposes herein set forth.

22. The combination, in a dredging, excavating, plowing, and ditching machine, of a truck, gallows-frame, bucket-ladder, and an endless revolving bucket-chain with a capstan and clutching mechanism, whereby the truck may be propelled forward mechanically, and automatically forced backward by the action of the revolving chain of buckets or scoops on the bottom of the ditch, thus adapting the machine to continuous operation, substantially as herein described.

23. The combination of an oscillating and sliding frame D, windlass-shaft M, loose pinion $k$, and oscillating chains with windlasses and clutching mechanism, substantially as described, whereby the frame may be propelled forward mechanically, and automatically forced backward by the action of the revolving chain of buckets or scoops on the bottom of a river, canal, harbor, or bay, thus adapting the machine to continuous operation, as set forth.

In testimony that I claim the foregoing as my own I affix my signature in presence of two witnesses.

JOHN EDWARD WORTHMAN.

Witnesses:
 MANUEL PRIMO,
 A. W. DANNELL.